(12) United States Patent
Kern et al.

(10) Patent No.: US 11,639,434 B2
(45) Date of Patent: May 2, 2023

(54) CONTAINER CLOSURE MADE OF METAL OR PLASTIC

(71) Applicant: ACTEGA DS GMBH, Bremen (DE)

(72) Inventors: Matthias Kern, Lilienthal (DE); Simon Heyder, Ganderkesee (DE)

(73) Assignee: ACTEGA DS GMBH, Bremen (DE)

( * ) Notice: Subject to any disclaimer, the term of this patent is extended or adjusted under 35 U.S.C. 154(b) by 291 days.

(21) Appl. No.: 15/554,498

(22) PCT Filed: Mar. 2, 2015

(86) PCT No.: PCT/EP2015/054314
§ 371 (c)(1),
(2) Date: Aug. 30, 2017

(87) PCT Pub. No.: WO2016/138930
PCT Pub. Date: Sep. 9, 2016

(65) Prior Publication Data
US 2018/0057670 A1    Mar. 1, 2018

(51) Int. Cl.
*C08K 5/10* (2006.01)
*C08L 23/06* (2006.01)
(Continued)

(52) U.S. Cl.
CPC ............... *C08L 23/06* (2013.01); *C08L 23/22* (2013.01); *C08L 53/00* (2013.01); *B32B 1/02* (2013.01);
(Continued)

(58) Field of Classification Search
CPC .......... B65D 41/04442; B65D 43/0212; B65D 41/0442; Y10T 428/1352; B32B 24/04
(Continued)

(56) References Cited

U.S. PATENT DOCUMENTS

| 6,410,109 B1 | 6/2002 | Shachi et al. |
| 6,677,397 B1 * | 1/2004 | Baranowski ........... B65D 41/34 524/488 |

(Continued)

FOREIGN PATENT DOCUMENTS

| EP | 0 853 096 | 7/1998 |
| WO | 00/75224 | 12/2000 |

(Continued)

OTHER PUBLICATIONS

Oppanol PIB by BASF (Year: 2013).*
(Continued)

*Primary Examiner* — Ellen S Hock
(74) *Attorney, Agent, or Firm* — Fitch, Even, Tabin & Flannery LLP

(57) ABSTRACT

A closure made of metal or plastic for a container for accommodating beverages or food has a mouth opening which is to be closed by the container closure. The container closure has a sealing insert which is arranged such that it closes the mouth opening with sealing action when the container closure is fitted on the container. The container closure, including the sealing insert, does not contain any halogen-containing material, and the sealing insert comprises at least two different polymers, of which at least one is a barrier polymer with a Shore D hardness of at most 40 and oxygen permeability of at most 1000 cm³·100 μm/m²·d·bar and, without the Shore D hardness being limited, with oxygen permeability of at most 10 cm³·100 μm/m²·d·bar.

35 Claims, 1 Drawing Sheet

(51) Int. Cl.
*C08L 53/00* (2006.01)
*C08L 23/22* (2006.01)
*B65D 53/02* (2006.01)
*B65D 41/12* (2006.01)
*B65D 53/00* (2006.01)
*B32B 1/02* (2006.01)
*B32B 25/04* (2006.01)
*B65D 53/06* (2006.01)

(52) U.S. Cl.
CPC .............. *B32B 25/04* (2013.01); *B65D 41/12* (2013.01); *B65D 53/00* (2013.01); *B65D 53/02* (2013.01); *B65D 53/06* (2013.01); *Y10T 428/1352* (2015.01)

(58) Field of Classification Search
USPC .......................................... 220/378; 428/34.1
See application file for complete search history.

(56) References Cited

U.S. PATENT DOCUMENTS

| | | | |
|---|---|---|---|
| 7,021,478 B1 * | 4/2006 | Hock | B65D 41/045 |
| | | | 215/349 |
| 9,708,478 B2 | 7/2017 | Eichler et al. | |
| 10,189,610 B2 * | 1/2019 | Mangel | B65D 41/0442 |
| 2002/0155238 A1 | 10/2002 | Shachi et al. | |
| 2006/0229402 A1 | 10/2006 | Varma | |
| 2007/0053788 A1 * | 3/2007 | Zhao | A61L 2/206 |
| | | | 422/22 |
| 2009/0230079 A1 * | 9/2009 | Smolko | B65D 51/16 |
| | | | 215/261 |
| 2010/0006532 A1 * | 1/2010 | Lee | B65D 53/04 |
| | | | 215/349 |
| 2016/0152808 A1 | 6/2016 | Eichler et al. | |

FOREIGN PATENT DOCUMENTS

| | | |
|---|---|---|
| WO | 02/064676 | 8/2002 |
| WO | 2015/010718 | 1/2015 |
| WO | 2016/069454 | 5/2016 |

OTHER PUBLICATIONS

International Preliminary Report on Patentability and Written Opinion of the International Searching Authority dated Sep. 14, 2017, which issued during prosecution of International Application No. PCT/EP2015/054314.

International Search Report dated Nov. 2, 2015, which issued during prosecution of International Application No. PCT/EP2015/054314.

New Zealand First Examination Report dated Mar. 12, 2018, which issued during prosecution of New Zealand Application No. 735807.

Kaneka, SIBSTAR, Thermoplasic Elastomer Wholly Saturated Styrene Isobutylene Block Copolymer (Jan. 2022), 7 pages.

L. Pinchuk et al., Medical applications of poly(styrene-block-isobutylene-block-styrene)("SIBS"), Biomaterials (2007), 13 pages.

Advanced Elastomer Systems Trefsin 3101-65 W305 Thermoplastic Rubber (accessed May 19, 2021), 2 pages.

* cited by examiner

CONTAINER CLOSURE MADE OF METAL OR PLASTIC

RELATED APPLICATIONS AND INCORPORATION BY REFERENCE

The present patent application is filed pursuant to 35 U.S.C. § 371 as a U.S. National Phase Application of International Patent Application No. PCT/EP2015/054314 filed on Mar. 2, 2015. The International Application was published as WO 2016/138930 on Sep. 9, 2016. The contents of the aforementioned patent application is herein incorporated by reference in its entirety.

The invention generally relates to container closures with a polymer-based sealing insert for bottles and other containers for accommodating beverages and food. More particularly, the invention relates to container closures provided with a sealing insert that contain at least one barrier polymer. The container closures are free of halogen-containing substances and are also suitable for demanding applications, more particularly in wine, sparkling wine and champagne bottles, and in crown caps of reduced sheet thickness.

Beverages and foods are placed in different types of containers for transport, storage, or preservation. These containers must often be closable so that the contents do not escape and are protected from the entry of undesired substances that would contaminate or damage them. In many cases of application, these are only solid or liquid impurities. If the contents are sensitive to gaseous substances, these must also be prevented from entry. This is achieved by means of a correspondingly configured container closure.

Container closures of metal and/or plastic have been known for some time. They are used, for example, in the form of screw caps, rotational closures, and crown caps for the sealed closure of containers such as bottles, glasses, and the like. Such containers have a mouth opening that must be closed by the container closure. In this case, sufficiently tight closure of the container must be ensured, in order on the one hand to prevent the container contents from escaping and on the other to protect the container contents from entry of undesirable substances, including gaseous substances such as oxygen, trichloroanisole, and the like.

The necessary tightness is ordinarily achieved by means of a sealing insert composed of a material that is sufficiently solid on the one hand, but also elastic on the other and is arranged in the container closure so that it comes into contact with the mouth opening of the container when the container closure is fitted onto the container. In most cases, the sealing insert is disk-shaped or ring-shaped and arranged on the inside of the container closure. When the container is in a closed state, the insert lies against the container mouth opening and is pressed by the container closure against the mouth opening, and its hardness, together with its elasticity, results in sealing. In this case, a good sealing insert compensates for the always-present unevenness of the container mouth opening. The more uneven the mouth opening, therefore, the greater the requirements placed on the sealing insert.

An essential factor in meeting such requirements is the proper choice of the material for the sealing insert. Many known materials are well-suited for relatively simple applications, but less suitable or unsuitable for more demanding seals.

In this case, the sealing insert must also meet further requirements, e.g. it must be pasteurizable or even sterilizable for many applications. It must be capable of withstanding considerable internal pressure (e.g. in the case of carbon-dioxide-containing beverages), but yield in controlled fashion when said pressure is exceeded (overpressure valve action).

If the container closure is a rotational closure, the sealing insert must not show excessively high resistance to turning of the container closure on the mouth opening.

In addition, one must be able to produce the sealing insert and fit it into the container closure in as simple a manner as possible. The method is known of cutting disk-shaped sealing inserts from webs or films and then fitting them into the container closure (out-shell molding) or, often preferably, of introducing them in flowable form into the container closure and shaping and solidifying them there (in-shell molding). In-shell molding also makes it possible to achieve sealing inserts that are ring-shaped rather than disk-shaped.

In polymer-based sealing inserts, this is conventionally carried out by introducing them as plastisol, followed by molding and drying, or in thermoplastic materials by introducing them in a heated flowable state, followed by molding and drying.

While PVC-containing sealing inserts were formerly widely used, there is currently considerable concern about PVC and other halogen-containing materials. They are considered to be potentially harmful to health, and they also cannot be disposed of without problems. In many countries, the use of such halogen-containing materials is regulated or even prohibited by laws or regulations.

There is therefore a considerable need for container closures that do not contain halogenous materials without having to forego the advantages offered by sealing inserts containing PVC, for example, with respect to processing, sealing properties, costs, etc.

There are already numerous proposals in this connection in the prior art.

For example, the method has been known for decades of producing sealing inserts based on non-halogen-containing polymers (for both rotational closures and pry-off closures such as crown caps). These sealing inserts are consistently compounds, i.e. mixtures of one or (usually) a plurality of polymers with additives that adapt the properties of the sealing insert to the intended application, facilitate its processing or use, etc.

Typical polymers in such compounds are thermoplastics, primarily polyolefins, thermoplastic elastomers, elastic thermoplastics and synthetic rubbers. Typical additives are plasticizers, oils, lubricants, antioxidants, stabilizers, pigments, fillers, and the like.

Depending on their selected components, polymer-based sealing inserts show differing permeability for foreign matter. Such foreign matter can enter, for example, between the sealing insert and the container mouth opening if the sealing insert does not optimally lie against the mouth opening. They may also be soluble in the material of the sealing insert and diffuse into the container. The sealing insert must therefore be optimized with respect to its mechanical properties (more particularly hardness and elasticity) and its chemical properties (solubility of foreign matter).

In order to reduce or even prevent the entry of gaseous substances, the method of utilizing the intrinsic barrier properties of certain polymers is already known. Polymers differ in their specific permeability for oxygen (and other substances such as trichloroanisole). In some polymers, this permeability is particularly low, and these are often referred to in the prior art as "barrier polymers." (In the context of this invention, polymers that meet the definition given in the following will be referred to as "barrier polymers.") Examples of such barrier polymers are materials such as isobutene-isoprene copolymer (PIBI), also known as butyl rubber (IIR); styrene-isoprene-butadiene-styrene block copolymer; polybutene (PB); polyisobutylene (PIB), and others that will be mentioned below ("butene" and "butylene" are synonyms). Proposals have already been made in the literature for halogen-free container closures based on barrier polymers, for example in CA 2436170; EP 754743; EP 1606101; EP 1816086; US 2004 0161560, and WO 2011 094094. In order to adapt the mechanical properties in cases of a given chemical suitability, such polymers are combined in compounds with other substances that ensure suitable hardness and elasticity of the compound. Known compounds achieve this object in any case when the requirements are less problematic.

Compounds are known from EP 1409584 that comprise styrene-ethylene-butylene-styrene (SEBS), PIB oil, and polypropylene. The content of PIB oil has been thought to contribute to the barrier effect. Nevertheless, a series of experiments with varying contents of PIB oil shows that only the PP content is responsible for the barrier effect; the PIB content has no positive effect. The barrier effect of these compounds is low overall, and is clearly outside of the ranges according to the invention defined below in greater detail.

The method of adding one or a plurality of substances to the material that chemically bind penetrating oxygen and thus "capture" it—and are therefore also referred to as "scavengers"—is already known. An example thereof is sodium sulfite, which is incorporated into the sealing insert in the form of solid particles having a suitable diameter.

However, there is still a need for sealing inserts without halogen-containing materials that allow an improved sealing action in problematic and demanding applications in particular, more specifically in the applications discussed below by way of example:

If the contents are intended to remain in the container over a long period, an effective closure is particularly important. A known example is wine (the same applies for similar beverages such as sparkling wine, prosecco, champagne, and the like), which is traditionally placed in bottles and remains therein until it is consumed. The period between filling of the bottle and consumption can be years, or particularly in the case of high-quality wines, even decades.

Wine bottles are relatively simple and inexpensive products with considerable manufacturing tolerances, are relatively uneven, and also often have hairline cracks in the area of the mouth opening. This makes an effective closure difficult. In the case of a conventional closure with natural corks (made from the bark of the cork oak) pressed into the bottleneck, such problems are solved to a certain extent, because the elastic corks can compensate for the usual measurement tolerances, and any defects in the area of the mouth opening ordinarily have no effect. For this reason, although the closure is usually sufficient over a certain period of time, it is not completely sealed, and the wine "ages" in the bottle under the effect of oxygen that slowly penetrates from the air into the bottle. This may be desired, but must in such cases take place in a controlled manner, because the wine will otherwise not reach its intended "lifetime."

Natural corks vary considerably not only in the individual quality of their dimensions, elasticity, and porosity. Natural corks are also susceptible to degenerative processes such as cork rot that may lead to changes in taste and even to mechanical failure of the closure during storage, so that the wine is damaged or even becomes undrinkable, and may leak out.

There are already improved closures, for example natural corks having an outer coating of polymer materials or bottle corks composed entirely of glass, but in the area of high-quality wines in particular, such closures are not accepted by the consumer without reservations. Instead, wine bottles may be provided with glass closures (externally plastic-coated glass stoppers), which improves consumer acceptance, but is relatively expensive.

For this reason, wine manufacturers have also long used screw caps as an alternative to the closures discussed above—in the simplest case, and particularly for relatively inexpensive wines with a short duration of storage, these are screw caps of metal or plastic that are also used for beverages contained in bottles such as water, juices, and the like. For these applications, the wine bottle must have external thread elements in the area of the mouth opening so that the screw cap can be screwed on. In this case, in contrast to corks and other stoppers, the sealing function is shifted to the mouth opening of the bottle.

Nevertheless, wine bottles with a screw closure are also typically mass-produced products with mouth openings that are not significantly better in quality than those of conventional wine bottles. In this case as well, the mouth openings are uneven and non-uniform. Many screw cap wine bottles have hairline cracks in the area of the mouth opening. A conventional sealing insert (for example an aluminum screw cap for mineral water or juice) cannot always compensate for this, even in the case of short storage periods, with the result that the wine may leak out. Even if only a small amount of wine leaks out through such hairline cracks, this reduces the shelf life of the wine and the acceptance of the product.

Such conventional rotational closures are generally unsuitable for high-quality wines that may be stored over decades. This is due not only to the danger of leaks, but also and in particular because the sealing insert cannot effectively protect the wine from the penetration of oxygen (and possibly other gaseous impurities) over such long periods. Without wishing to be bound to a theoretical explanation, it is assumed that the known sealing inserts are not soft enough to seal hairline cracks. It does not appear possible to optimize such known compounds by the generally known methods (addition of plasticizing polymers or other plasticizers) without simultaneously compromising the other required properties (elasticity, barrier effect, no taste impairment, etc.).

A solution to this problem has recently come onto the market that has brought about a certain improvement. Screw-on container closures for wine bottles are on the market with names such as "Saranex" and "Saran Tin" that show a significantly improved barrier effect. Saranex closures have a disk-shaped sealing insert with a multilayer structure of foamed polyethylene (PE) and polyvinylidene chloride ("Saran"). In Saran Tin, there is an additional metal film lamination. The disks are punched from the coextruded material and inserted into the container closure in such a manner that the foamed PE faces toward the bottle mouth opening. Polyvinylidene chloride is a highly effective barrier polymer, and due to its elasticity, the foam structure provides favorable sealing in the area of contact between the mouth opening and the sealing insert.

A summary overview can be found in H. J. Köhler et al., "Untersuchung zum Abdichtungsverhalten von Longcap-Verschlussen" [Investigation of the sealing behavior of long cap closures], Der Deutsche Weinbau, No. 03/2010.

A considerable drawback of this known solution lies in the fact that polyvinylidene chloride is a halogen-containing polymer.

Moreover, these materials are only capable of deep-drawing to a limited extent. The sealing insert is a "smooth" flat disk which, despite the (limited) adaptation to the opening, in which the foam structure plays a part, cannot always fully seal the mouth opening. In non-optimum bottles, particularly those with hairline cracks in the area of the mouth opening of the bottle, leaks occur, i.e. wine leaks out through the cracks—particularly when the bottles are stored on their sides, as is commonly the case. The production process does not allow this to be counteracted by profiling of the sealing insert.

Moreover, the need to punch out the sealing disks and then insert them into the container closure results in additional expense compared to sealing inserts that can be produced by means of in-shell molding and increases the risk that the prefabricated disks will be damaged on insertion. If the sealing disk does not fit perfectly into the container, sealing is adversely affected, causing an increase in leaks. The compressive strength of the sealing insert is limited.

Impairments of taste caused by the material of the sealing insert may also occur.

Moreover, these sealing systems are relatively expensive.

Accordingly, there is a need for further improvements, especially for the above-discussed applications in wine, etc.

A related problem that can also be solved by means of the invention occurs in the case of pry-off container closures, more particularly crown caps.

In this case as well, the conventional containers, typically beer bottles and bottles for carbonated soft drinks and mineral water, are also mass-produced products with a fluctuating quality of the mouth opening with respect to unevenness, hairlike cracks, and the like.

Beverages such as beer, soft drinks, and mineral water are susceptible to changes in taste that may be caused by oxidation following the entry of oxygen and/or by the penetration of taste-altering substances such as trichloroanisole.

However, the storage times are usually short. There are sealing inserts in the prior art that ensure sufficient sealing with conventional crown caps.

A problem has recently resulted from the need for manufacturers to change over to thinner and thus mechanically weaker sheets for such crown caps. While conventional crown caps in Europe have a sheet thickness of 0.23 mm, one should work with sheet thicknesses of 0.20 mm and below, and up to 0.17 mm, in order to save material.

However, a crown cap body composed of thinner sheet material cannot reliably press the sealing insert placed inside it against the container mouth opening with the same force as a conventional body composed of thicker sheet material. The sealing insert must also ensure sealing in such situations, primarily by means of an optimized ratio of hardness to elasticity. For this purpose, it must be softer, but also must not lose its elasticity.

In this case as well, there is a need for improved container closures. For this application, however, the sealing insert need not be quite as soft as in the above-described application in wine bottle closures.

The goal of the invention is to provide improved closures that can be used not only generally, but also for the particularly demanding applications discussed here.

Against this backdrop, it is an important object of the invention to propose improved container closures without halogen-containing materials having a sealing insert that can be configured both as a rotational closure and a pry-off closure and can be produced more simply and therefore more economically. A further important object of the invention is to provide such container closures with improved sealing, more particularly against leaks, in mass-produced containers such as wine bottles, beer bottles, and the like.

In this case, the favorable barrier effect of known sealing inserts is also to be preserved.

It is among the objects of the invention to provide container closures with a sealing insert that can be produced by in-shell molding.

It should be possible to configure the sealing insert to be extremely soft in order to allow reliable sealing the bottle even in the case of hairline cracks and similar mouth opening defects.

It should be possible provide the sealing insert with profiling, and the material of the sealing insert should also be capable of deep drawing.

The container closure is also to remain taste-neutral and provide the required sealing even over long application periods of several years, and sometimes decades, even in contact with alcoholic beverages such as wine.

Further objects and advantages of the invention can be found in the following description, including the embodiments.

The invention solves these and other objects by means of the combinations of features given in the independent claims.

Advantageous embodiments are defined in the subclaims.

In the following more detailed description of the invention, definitions and features are first discussed which, independently of individual examples, are of general significance for the invention and its optimum embodiments. The definitions already given above are to be noted and do not conflict with the following discussion. Unless otherwise specified in the description, technical terms have their usual meaning.

The invention is then illustrated by means of individual embodiments.

Definitions and Measuring Methods

A container closure is composed of a body of metal and/or plastic and a sealing insert arranged therein. The container closure may be a rotational closure (with thread elements, including cams and the like) or a closure that can be removed (without rotating the container closure), usually pried off (pry-off closure), including crown caps, snap caps, and the like. A stopper does not constitute a container closure in this sense.

A sealing insert within the meaning of the invention is a generally disk-shaped or ring-shaped mold (optionally provided with profiling) that is composed either of one homogeneous polymer compound or at least two different, respectively homogeneous materials, at least one of which is a homogeneous polymer compound.

"In-shell molding" is understood to refer not only to the known methods in which a polymer compound that has been made thermally flowable is inserted in the closure body and stamped therein into a disk-shaped sealing insert (SACMI or Zapata method), but also to methods in which the polymer compound is inserted by injection, optionally only in the edge area of the sealing surface, and molded into a ring-shaped sealing insert.

Polymer compounds within the meaning of the invention are mixtures of one or (usually) a plurality of polymers with additives (e.g. plasticizers, anti-blocking agents, lubricants, antioxidants, stabilizers, fillers, pigments, etc.) that adapt the properties of the compound to the provided application, facilitate its processing or use, etc.

A thermoplastic polymer is an industrially-produced polymer with elastic properties that are based on its molecular structure. Typical thermoplastic polymers are (block) copolymers of styrene and butadiene, also with other added monomers (ethylene, isoprene, etc.).

Within the meaning of the invention, a barrier polymer is a polymer which, in pure form, shows resistance to the penetration of oxygen ("intrinsic resistance") corresponding in polymers with a Shore D hardness of at most 40 to an oxygen permeability of at most 1000 $cm^3 \cdot 100$ μm/$m^2 \cdot d \cdot bar$, or without the Shore D hardness being limited (more particularly at a Shore D greater than 40), corresponding to an oxygen permeability of at most 10 $cm^3 \cdot 100$ μm/$m^2 \cdot d \cdot bar$. This oxygen permeability is determined in accordance with DIN 53380-3 at an oxygen concentration of 100%, relative humidity of 100%, and atmospheric pressure, but at a measuring temperature of 26° C. and relative to a layer thickness of the polymer test piece of 100 μm (with this conversion being optional). Typical barrier polymers in the context of this invention are thermoplastic elastomers.

Oxygen measurement is carried out with an OX-Tran 2/60 from Mocon.

For measurement of the oxygen permeability, a plate measuring 150×150×0.7 mm in thickness is pressed, and corresponding test pieces (10 $cm^2$) are cut from it. The test piece is conditioned. The test piece is inserted between the two parts of the permeation chamber and clamped in place in a gastight manner. Vacuum grease is used in order to seal off the test piece from the lower permeation chamber. On one side of the test piece, forming gas flows at a specified flow rate during measurement, and oxygen is fed through the measuring chamber on the other side. The oxygen passes through the film into the carrier gas (forming gas). The forming gas is transported to a sensor, which determines the concentration of oxygen in the forming gas. Preconditioning is carried out for 1 hour before each measurement. After a specified period at pressure of 1 bar and room temperature, the oxygen concentration reaches a constant plateau, at which time the permeability can be determined.

Percentages in this description are percentages by weight relative to total weight in cases where they pertain to portions of components of a product composed of a plurality of components.

The oxygen transmission rate (OTR) is a measure of the oxygen permeability of a material (pure material or material mixture). It is determined in accordance with DIN 53380-3, as indicated above. The OTR is given in units of $cm^3 \cdot 100$ μm/$m^2 \cdot d \cdot bar$. In the above-mentioned measuring method, the accuracy of determination is approx. 4 $cm^3 \cdot 100$ μm·$m^2 \cdot d \cdot bar$.

The melt flow rate (MFR) indicates the ability of a substance or substance mixture to flow at 190° C. and under a load of 5 kg. It is determined according to ISO 1133 and given in g/10 min.

The Shore D hardness indicates the hardness of a substance or substance mixture. It is determined in accordance with ASTM 2240 using press plates of at least 6 mm in thickness. The measuring time is 5 seconds, after which the corresponding test pieces were produced at 180° C. in the compression molding process.

The Shore A hardness is determined similarly to the Shore D hardness in accordance with ASTM D 2240. In this case as well, the measuring time is 5 seconds.

The compression set (CS) is a measure of the elastic behavior (permanent deformation) of a substance or substance mixture. The test pieces are produced in the injection-molding process at temperatures of 170-230° C. The test pieces have a diameter of 25 mm and a thickness of 6 mm. The measuring tolerances are in accordance with ISO 815-1. The relevant test pieces are conditioned. In the CS, the respective test piece is subjected at a respective given temperature to a compression of 25% for 22 hours. After a loading duration of 22 hours, the test piece is unclamped, and after 30 minutes, the thickness of the test piece is again measured or the permanent deformation determined. It is measured in accordance with ISO 815-1 at the respectively given temperature after a loading duration of more than 22 hours and indicated in percent of the permanent compression relative to the test piece prior to compression.

A CS of 25% therefore corresponds to a permanent compression of the test piece by a quarter of its original height (thickness).

A compound is processable within the meaning of the invention if it is processable in a conventional manner for production of container closures with polymer-based sealing inserts.

The standard dimensions of simple screw caps are 28 mm in external diameter (or width) by 15 mm in external height (i.e. length). Those of long caps, such as those provided in particular according to the invention for wine bottles and the like, are 30 mm in external diameter (i.e. width) by 60 mm in external height (i.e. length).

A material is pasteurizable according to the invention if it allows gastight closure in industrial pasteurization at 62° C. to 85° C. and does not lose its properties of use for the provided application.

DETAILED DESCRIPTION OF THE INVENTION

Figure 1:
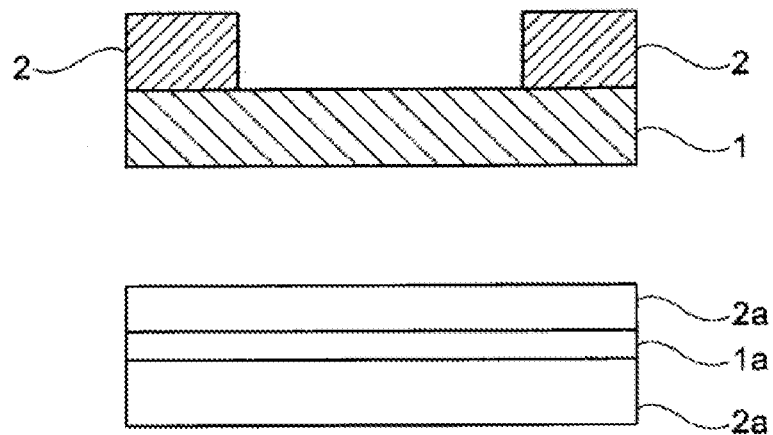
FIG. 1 illustrates two embodiments of sealing insert.

According to the invention, a container closure of metal or plastic for a container for accommodating beverages or food that has a mouth opening to be closed by said container closure is provided with a sealing insert that is arranged in the container in such a manner that it closes the mouth opening with sealing action when the container closure is fitted onto the container.

In a first preferred embodiment, the sealing insert comprises a polymer compound that contains at least two different barrier polymers, but no halogen-containing polymers. Such sealing inserts can be used in a wide variety of applications, particularly those in which the sealing insert formerly contained only one polymer. Because of the interaction among the plurality of barrier polymers, there is improved adjustability of the hardness and elasticity of the sealing insert with an overall improved barrier function.

For in-shell molding processes, the sealing insert preferably comprises the at least two different barrier polymers in a mixture with one another.

For out-shell molding in particular, as discussed below with reference to FIG. 1, it can instead be provided that the sealing insert has at least two different barrier polymers that are essentially unmixed with one another (and e.g. occur in different layers of a multilayer structure).

The barrier polymers used according to the invention are generally selected from the group comprising butyl rubber (IIR); polyisobutylene (PIB); styrene block copolymers, more particularly styrene-isobutylene-styrene (SIBS), styrene-isoprene-styrene (SIS), styrene-vinyl isoprene-styrene, and hydrogenated styrene-vinyl isoprene-(co-)isoprene-styrene; polyamide (PA); ethylene-vinyl alcohol copolymers (EVOH); and thermoplastic elastomers (TPE-V), more particularly allyl-styrene with an isobutene content of >50% in the rubber components, wherein the total content of isobutylene-based polymers in the sealing insert preferably does not exceed 60% by weight, more preferably 55% by weight, and particularly preferably 50% by weight in order to keep the stickiness of the polymer compounds within practicable limits.

The sealing insert contains at least one further (other) polymer that is not a barrier polymer and is used for adjustment of the hardness and elasticity of the sealing insert, but can also optionally contribute to the barrier effect of the sealing insert. This further (other) polymer generally comprises a polyolefin, more particularly polyethylene and/or a polyethylene copolymer, preferably PE-HD, PE-LD, PE-LLD ($C_4$, $C_6$ or $C_8$) and/or VLDPE, MD-LDPE, EVA, EEA, EMA, EAA, EBA, polypropylene and/or propylene copolymer.

Alternatively or additionally, the sealing insert may comprise a TPE, more particularly SBS, SEBS, SIBS, SIS, SEP, SEPS, or SEEPS.

In preferred embodiments, the sealing insert contains a mixture of butyl rubber (IIR) and styrene-isobutylene-styrene (SIBS). The butyl rubber has particularly favorable barrier properties and is preferably soft, but not very elastic (CS), and tends to undergo cold flow (retardation). The SIBS has a somewhat higher oxygen permeability and is harder, but more elastic, and also has less of a tendency to undergo cold flow.

The combination of butyl rubber and SIBS is superior to the individual components with respect to softness and elasticity (and thus its sealing action). The sealing functionality can be further improved if at least one polyolefin (see above) is also included. This reduces creep tendency and improves processability.

In particularly preferred embodiments, the sealing insert contains up to 25% by weight of butyl rubber, up to 65% by weight of SIBS, and preferably up to 60% by weight, more preferably up to 55% by weight, and particularly preferably up to 50% by weight of PE-HD, PE-LD, and/or PE-LLD.

The polymer compound that forms the sealing insert preferably contains at least one additive such as a plasticizer, e.g. polybutene oil or white oil; a stickiness-reducing agent (anti-blocking agent), and/or a lubricant, wherein the plasticizer content is preferably less than 70% by weight, more preferably less than 60% by weight, even more preferably less than 50% by weight, particularly preferably less than 40% by weight, especially less than 30% by weight, especially less than 20% by weight, and especially less than 10% by weight, more preferably less than 5% by weight, and even more preferably less than 1% by weight or the sealing insert is free of plasticizers.

The polyolefin contained in the polymer compound generally has a melt flow rate (MFR) under a 5 kg load and at 190° C. of greater than 15 g/10 min, preferably at least 20 g/10 min.

It is generally preferable if the sealing insert has a Shore D hardness of less than 50, preferably less than 40, and particularly preferably less than 30, wherein the Shore D hardness is often between 15 and 40, and preferably between 25 and 40.

In this case, the Shore A hardness of the sealing insert is preferably between 55 and 100.

In general, the sealing insert should show an OTR of less than 940 $cm^3 \cdot 100$ $\mu m/m^2 \cdot d \cdot bar$, more particularly less than 850 $cm^3 \cdot 100$ $\mu m/m^2 \cdot d \cdot bar$, more preferably less than 800 $cm^3 \cdot 100$ $\mu m/m^2 \cdot d \cdot bar$, especially less than 770 $cm^3 \cdot 100$ $\mu m/m^2 \cdot d \cdot bar$, and more particularly less than 700 $cm^3 \cdot 100$ $\mu m/m^2 \cdot d \cdot bar$, wherein (more particularly for applications in wine closures) an OTR of less than 670 $cm^3 \cdot 100$ $\mu m/m^2 \cdot d \cdot bar$, especially less than 630 $cm^3$, 100 $\mu m/m^2 \cdot d \cdot bar$, preferably less than 600 $cm^3 \cdot 100$ $\mu m/m^2 \cdot d \cdot bar$, and particularly preferably less than 560 $cm^3 \cdot 100$ $\mu m/m^2 \cdot d \cdot bar$ is preferred.

Sealing inserts according to the invention preferably have a melt flow rate (5 kg, 190° C.) of at least 5, preferably at least 10, and particularly preferably at least 15 g/10 min. Melt flow rates of at least 20 g/10 min are particularly preferred.

In order to achieve the desired elasticity, the sealing insert should preferably have a compression set (CS) at 25% compression, 23° C., and 22-hour storage of between 20% and 70%, and more particularly between 40% and 65%, a CS at 25% compression, 40° C., and 22-hour storage of between 45% and 70%, and a CS at 25% compression, 70° C., and 22-hour storage of between 50% and 80%, which can be achieved by means of the qualitative and quantitative composition of the polymer compound.

In particularly advantageous embodiments, the sealing insert contains butyl rubber, SIBS, and at least one polyolefin, preferably in the above-mentioned content ranges, and has an oxygen permeability of less than 700 $cm^3 \cdot 100$ $\mu m/m^2 \cdot d \cdot bar$ at a CS (25% compression, 23° C., 22-hour storage) of between 40% and 65% and a melt flow rate (5 kg/190° C.) of more than 1 g/10 min, more particularly more than 10 g/10 min.

The container closure can generally be any desired screw- or pry-off closure. However, it is preferably a screw cap, more particularly an aluminum screw cap with a diameter of 28 mm, 30 mm or 38 mm, more particularly 28×15 mm or 30×60 mm (long cap), or a crown cap, more particularly with a sheet thickness of less than 0.21 mm.

The container closure is preferably pasteurizable together with its sealing insert, more particularly at temperatures in the range of 62° C. to 70° C.

Figure 2:
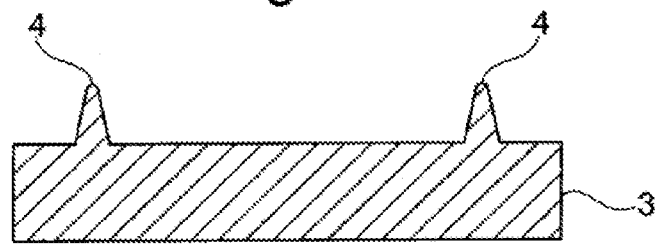
FIG. 2 illustrates three embodiments of sealing insert.
Figure 2:
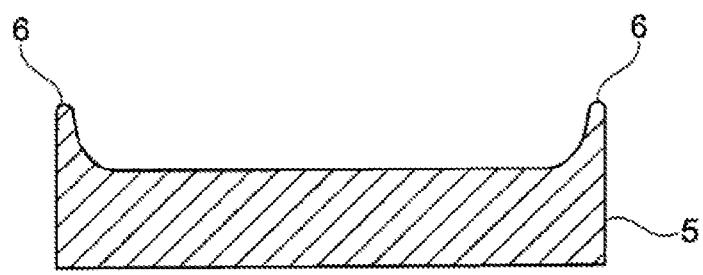
Figure 2:
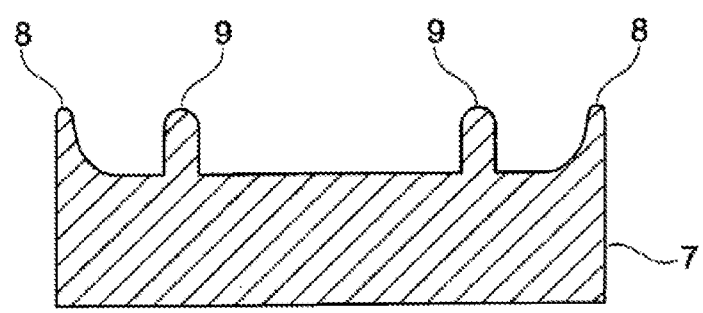

The sealing insert is preferably configured as a ring or disk and has a sealing lip running around its circumference that protrudes when the container closure is in an attached state in the direction of the mouth opening of the container. FIG. 2 shows schematic sections of several variants of this preferred embodiment, in which an in principle disk-shaped sealing insert (3, 5, 7) has one or two sealing lips (4, 6, 8, 9) around its circumference that are preferably formed during in-shell molding of the sealing insert. In this case, a single sealing lip can be provided that is radially arranged such that it engages with the container mouth opening (not shown) internally (4) or externally (6). However, two sealing lips (8, 9) can also be arranged such that together, they engage with the mouth opening of the container both internally and externally.

In other preferred embodiments, the sealing insert is composed of two different elements, with one being a ring-shaped or (preferably) disk-shaped first element that is preferably connected to the metal or plastic material of the closure body and the other being a (preferably) ring-shaped or disk-shaped second element that is arranged on the first element at least in the area in which the attached container closure is in contact with the mouth opening of the container. FIG. 1 shows a particularly preferred embodiment in which the first element (1) is disk-shaped and the second element (2) is ring-shaped.

Both elements may be composed of the same polymer compound, e.g. if it is advantageous to produce the sealing insert by means of out-shell molding, for example because it is desired to arrange another metal film or the like between the elements.

Alternatively, it may be advantageous for the first and the second element to be composed of different materials, wherein the material of the second element comprises at least one barrier polymer, and preferably at least two barrier polymers.

In another preferred embodiment (FIG. 1), the sealing insert is composed of two different materials, with the first material (1a) forming a disk-shaped element that is sandwiched between layers of the second material (2a), wherein the second material is a compound with at least one barrier polymer and a Shore D hardness of less than 40 and the first material is a compound or a pure polymer with a hardness greater than Shore D 40. If the second material has sufficient softness, the first material may also preferably comprise a barrier polymer, preferably selected from ethylene-vinyl alcohol copolymer (EVOH) and (optionally modified) polyamide (PA), or other hard materials having a high barrier effect.

The sealing insert may contain an oxygen-binding compound (scavenger), more particularly sodium sulfite. In order to improve the barrier effect, it may be provided, and more particularly laminated with a metal film, more particularly if it is produced in the out-shell molding process.

In order to further improve the sealing, the sealing insert may comprise a foamed polymer compound (in the area in contact with the container mouth opening).

The polymer compounds according to the invention preferably comprise at least two barrier polymers that differ in at least one physical parameter (for example Shore hardness). In general, this is preferably achieved in that the barrier polymers belong to different substance classes. Here, the term "substance classes" is to be understood as it is commonly understood in the case of plastics belonging to "different" substance classes that differ in functional groups or have a different basic structure. For this reason, for example, butyl rubber and SIBS belong to different substance classes. Accordingly, although they differ in several physical parameters, PE-HD and PE-LD do not belong to different substance classes.

Preferred polymer compounds contain at least one, and preferably at least two barrier polymers that are thermoplastic elastomers.

In this case, preferred barrier polymers are e.g. butyl rubber (IIR); polyisobutene (PIB); styrene block copolymers, more particularly styrene-isobutylene-styrene (SIBS), styrene-isoprene-styrene (SIS), styrene-vinyl isoprene-styrene and hydrogenated styrene-vinyl isoprene-(co-)isoprene-styrene; polyamide (PA); ethylene-vinyl alcohol copolymers (EVOH); and thermoplastic vulcanizates (TPE-V), more particularly those with an isobutene content of >50% in the rubber components, wherein the total content of isobutene-based polymers in the sealing insert preferably does not exceed 60% by weight, more preferably 55% by weight, and particularly preferably 50% by weight.

The oxygen permeability of a barrier polymer according to the invention is preferably at most 900 $cm^3 \cdot 100$ $\mu m/m^2 \cdot d \cdot bar$, more preferably at most 800 $cm^3 \cdot 100$ $\mu m/m^2 \cdot d \cdot bar$, especially preferably at most 700 $cm^3 \cdot 100$ $\mu m/m^2 \cdot d \cdot bar$, and even more preferably at most 600 $cm^3 \cdot 100$ $\mu m/m^2 \cdot d \cdot bar$ when the Shore D hardness of the barrier polymer is not greater than 40, preferably at most 8 $cm^3 \cdot 100$ $\mu m/m^2 \cdot d \cdot bar$, and even more preferably at most 6 $cm^3 \cdot 100$ $\mu m/m^2 \cdot d \cdot bar$.

Of particular significance in the context of this invention is the use of a container closure of the above-described type for closing a wine, sparkling wine, or champagne bottle.

In this case, a polymer material comprising at least one barrier polymer is used as a sealing insert in a closure, more particularly a screw cap and especially an aluminum screw cap, preferably having the dimensions 30×60 mm (long cap), for a wine, sparkling wine, or champagne bottle. Similar closures can be advantageously used for spirits (having an alcohol content of greater than 18% by volume, and more particularly greater than 24% by volume).

In another preferred use of the container closures described here, these are configured as crown caps with a sheet thickness of less than 0.21 mm, preferably less than 0.20 mm, and particularly preferably less than 0.18 mm.

EMBODIMENTS

In a series of tests (runs 1 to 12), various compounds were produced and tested for their suitability as sealing inserts. For this purpose, the compounds were produced in the conventional manner by mixing under heat in an extruder and then molded into test pieces meeting the specifications of the respective measuring method to be used (cf. above under "Definitions and measuring methods"). The results are shown in Table 1.

|  | Run 0 | Run 1 | Run 2 | Run 3 | Run 4 | Run 5 | Run 6 | Run 7 | Run8 | Run 9 | Run 10 | Run 11 | Run 12 |
|---|---|---|---|---|---|---|---|---|---|---|---|---|---|
| Butyl rubber | 24.46 | 19.7 |  | 19.7 |  |  | 19.7 | 19.7 |  | 9.7 | 9.7 | 10 | 10 |
| SIBS |  | 50 | 35 | 40 | 60 | 37.5 | 40 | 30 | 50 | 36 | 35 | 30 | 30 |
| PE-HD MFR 2 | 24.2 |  |  |  |  |  |  |  |  |  |  |  |  |
| PE-ED MFR 30 | 49.85 | 29.5 | 49.2 | 29.5 | 29.2 | 51.7 | 33.5 | 49.5 | 39.2 | 44.5 | 44.5 | 30.6 | 30.6 |
| PE-LD MFR 20 |  |  |  | 10 | 10 |  |  |  | 10 | 10 |  | 28.6 |  |
| PE-LLD MFR 20 |  |  |  |  |  |  |  |  |  |  | 10 |  | 28.6 |
| SEBS EH 504 |  |  | 10 |  |  | 10 |  |  |  |  |  |  |  |
| Polybutene oil |  |  | 5 |  |  |  |  |  |  |  |  |  |  |
| Talc | 0.74 |  |  |  |  |  |  |  |  |  |  |  |  |
| Titanium dioxide | 0.25 | 0.3 | 0.3 | 0.3 | 0.3 | 0.3 | 0.3 | 0.3 | 0.3 | 0.3 | 0.3 | 0.3 | 0.3 |
| Irganox 1010 | 0.05 | 0.15 | 0.15 | 0.15 | 0.15 | 0.15 | 0.15 | 0.15 | 0.15 | 0.15 | 0.15 | 0.15 | 0.15 |
| Irgafos 168 | 0.2 | 0.15 | 0.15 | 0.15 | 0.15 | 0.15 | 0.15 | 0.15 | 0.15 | 0.15 | 0.15 | 0.15 | 0.15 |
| Erucamide | 0.2 | 0.2 | 0.2 | 0.2 | 0.2 | 0.2 | 0.2 | 0.2 | 0.2 | 0.2 | 0.2 | 0.2 | 0.2 |
| Total | 100 | 100 | 100 | 100 | 100 | 100 | 100 | 100 | 100 | 100 | 100 | 100 | 100 |

-continued

|  | Run 0 | Run 1 | Run 2 | Run 3 | Run 4 | Run 5 | Run 6 | Run 7 | Run8 | Run 9 | Run 10 | Run 11 | Run 12 |
|---|---|---|---|---|---|---|---|---|---|---|---|---|---|
| Shore A | — | 68 | — | 80 | 83 | 94 | 86 | 94 | 92 | 94 | 95 | 95 | 96 |
| Shore D | 50 | 16 | — | 25 | 26 | 36 | 25 | 34 | 35 | 36 | 36 | 37 | 38 |
| MFR [190° C./5 kg] | 17.1 | 4.8 | — | 8.2 | 7.8 | 19.4 | 9.2 | 16.0 | 15.2 | 18.7 | 17.7 | 18.7 | 20.0 |
| OTR 25° C., 100% RH [$cm^3 * 100\ \mu m/m^2$-d] | 475 | 678 | — | 660 | 764 | 658 | 604 | 541 | 621 | 533 | 553 | 622 | 588 |
| Compression set at 28° C. | — | — | — | 50 | — | — | — | 57 | 37 | — | — | — | — |
| Compression set at 40° C. | — | — | — | 59 | — | — | — | 60 | 57 | — | — | — | — |
| Compression set at 70° C. | — | — | — | 67 | — | — | — | 62 | 65 | — | — | — | — |
| Processability | Yes | Yes | No | Yes | Yes | Yes | Yes | Yes | Yes | Yes | Yes | Yes | Yes |
| Stickiness | No | High | — | Medium | No | No | Low | No | No | No | No | No | No |

In some of these compounds (runs 0, 2, 4, 5 and 8), the sealing insert comprises only one barrier polymer, and in the other compounds (runs 1, 3, 6, 7, 9 to 12) the sealing insert comprises two barrier polymers.

Butyl rubber (X Butyl RB 101-3) and SIBS (Sibstar 102T FD) were used as barrier polymers.

Two different PE-HDs (MFR=2 or 30, density 0.954 g/cm³), PE-LD (MFR=20, density 0.924 g/cm³) and PE-LLD (MFR=20, density 0.924 g/cm³), were used as polyolefin components.

In run 0, talc (Luzenac) was used in order to reduce stickiness.

Irganox 1010 and Irgafos 168 were used as stabilizers or antioxidants.

Finawax E is erucamide, a lubricant.

The tests allow the following general conclusions to be drawn, which are relevant for all polymer compounds according to the invention and the sealing inserts produced from said compounds:

Run 0 is a compound with butyl rubber as the sole barrier compound. The oxygen permeability is low, but the Shore D hardness is too high for application in wine bottle closures. However, such compounds having only one barrier compound can be used for example in crown caps with reduced sheet thickness.

Run 1 has a total content of butyl rubber and SIBS of almost 70% by weight and is significantly softer than run 0. However, the compound is highly sticky, and the granulate tends to undergo blocking. The other runs, with a lower total content of isobutylene-based polymers (cf. run 4, with 60% by weight SIBS), were less sticky. No more blocking was observed below a total content of 50% by weight of isobutene-based polymers.

Run 2 has a relatively low content of SIBS as the sole barrier polymer and contains SEBS together with polybutene oil. This batch was not processable. Based on a comparison with run 5, which was similarly designed and was processable, this is assumed to be due to the oil components.

Run 3, with approx. 60% by weight, has a very high total content of isobutene-based barrier polymers compared to run 0 and very low hardness, with favorable, but not optimum, barrier properties. The batch was processable, but the product shows only moderate stickiness.

Run 4 also has around 60% by weight of barrier polymer, but only one (SIBS). The compound is harder than run 3, and oxygen permeability is higher. The combination of two barrier polymers (run 3) results in lower oxygen permeability.

Run 5 contains a relatively low content of SIBS as a single barrier polymer. The batch contains no softening oil and was processable; the product is not sticky. The polymer compound is harder and characterized by a higher oxygen barrier than in run 4. This is due to the higher PE-HD content. Despite the lower SIBS content, the barrier effect is better than in run 4.

Run 6 corresponds in the content of barrier polymers to run 3, with slightly modified polyolefin components. The use of a higher content of PE-HD causes the hardness of the polymer compound to increase. The oxygen permeability changes only slightly. To a certain extent, the hardness and barrier effect can therefore be adjusted by means of the polyolefin content.

Run 7 is similar to run 3 and run 6, with somewhat lower SIBS content and increased content of PE-HD. With increasing PE-HD content and decreasing SIBS content, the hardness of the polymer compound increases, while the oxygen permeability decreases slightly. Run 7 offers an insight into elastic behavior by means of the CS data. This compound represents a particularly preferred type of sealing inserts, especially for use in wine bottle caps (long caps).

Run 8 contains only SIBS as a barrier polymer and is to be compared to run 4. The compound contains less SIBS, but more PE-HD, and is accordingly harder. The oxygen permeability is slightly lower. The barrier function is significantly better, despite the reduced content of barrier polymers.

Run 9 is comparable to run 8 with respect to hardness and oxygen permeability. The total content of barrier polymers is lower, and the polyolefin content is higher. The barrier effect is outstanding, with comparable hardness. This is also a compound that can be particularly favorably used for sealing inserts that achieve the objects of the invention.

Run 10 differs from run 9 in the replacement of PE-LD by PE-LLD. With the same hardness, the barrier function is somewhat reduced, but still favorable.

Run 11 has a similar composition with respect to the barrier polymers to that of run 9 and run 10, but has an increased content of PE-LD. Because of the low crystallinity of PE-LD relative to PE-HD, the oxygen permeability increases. This would lower the material costs, but at the cost of even greater hardness and a significantly lower barrier effect. It should be noted that a compound such as that of run 11 can also be used as a sealing insert for long caps. According to the invention, the limits for hardness and barrier function are preferably Shore D=at most 50 and OTR=at most 940 $cm^3 \cdot 100\ \mu m/m^2 \cdot d \cdot bar$.

Run 12 is similar to run 11, wherein the PE-LD is replaced by PE-LLD. The two are comparable with respect to hardness and oxygen permeability.

In general, compounds with at least two barrier polymers are found to be superior to those that comprise only one barrier polymer (of the same type). It is also found that the properties of the sealing insert produced from the compound can be adapted and improved by the addition of other polymers, more particularly polyolefins. However, the comparison with runs 0 and 2 shows that a high content of polyolefins alone is not the decisive factor.

Compounds such as those in runs 0, 4, 5, and 8 with only one barrier polymer can be used in any case as sealing inserts for crown caps with reduced sheet thickness.

The findings presented here, obtained using test pieces composed of homogeneous compounds, can be applied to sealing inserts that are not molded from one homogenous polymer compound, but as described above, have a multi-layer structure, as shown in FIG. 1 by way of example.

The invention claimed is:

1. A container closure of metal or plastic for a container for accommodating beverages or food having a mouth opening to be closed by the container closure, with a sealing insert that is arranged in the container closure such that it closes the mouth opening with sealing action when the container closure is fitted onto the container, wherein the container closure, including the sealing insert, contains no halogen-containing materials, and the sealing insert comprises a combination of at least two different barrier polymers, each of which is a barrier polymer with a Shore D hardness of at most 40 and an oxygen permeability of at most 1000 cm$^3$·100 μm/m$^2$·d·bar, or, without the Shore D hardness being limited, with an oxygen permeability of at most 10 cm$^3$·100 μm/m$^2$·d·bar, wherein the oxygen permeability, in accordance with DIN 53380-3, is determined at an oxygen concentration of 100%, relative humidity of 100%, atmospheric pressure, and a measuring temperature of 26° C. and is relative to a layer thickness of 100 μm.

2. The container closure as claimed in claim 1, wherein the sealing insert comprises the at least two different barrier polymers in a mixture with one another.

3. The container closure as claimed in claim 1, wherein the sealing insert has the at least two different barrier polymers in different layers of a multilayer structure.

4. The container closure as claimed in claim 1, wherein the barrier polymers include one or more of butyl rubber (IIR); polyisobutylene (PIB); a styrene block copolymer; polyamide (PA); an ethylene-vinyl alcohol copolymer (EVOH); and a thermoplastic vulcanizate (TPE-V),
wherein the total content of isobutylene-based polymers in the sealing insert does not exceed 60% by weight.

5. The container closure as claimed in claim 1, wherein the sealing insert comprises two different barrier polymers and additionally at least one further polymer that is not a barrier polymer.

6. The container closure as claimed in claim 5, wherein the at least one further polymer comprises a polyolefin.

7. The container closure as claimed in claim 1, wherein the sealing insert comprises TPE including one or more of SBS, SEBS, SIBS, SIS, SEP, SEPS, and SEEPS.

8. The container closure as claimed in claim 1, wherein the sealing insert contains a mixture of butyl rubber (IIR) and styrene-isobutylene-styrene (SIBS).

9. The container closure as claimed in claim 8, wherein the sealing insert additionally contains at least one polyolefin.

10. The container closure as claimed in claim 1, wherein the sealing insert contains at least one additive.

11. The container closure as claimed in claim 1, wherein the sealing insert contains up to 25% by weight butyl rubber, up to 65% by weight of SIBS, and up to 60% by weight of one or more of PE-HD, PE-LD, and PE-LLD.

12. The container closure as claimed in claim 11, wherein the one or more of PE-HD, PE-LD, and PE-LLD has a melt flow rate (MFR at 5 kg/190° C.) of greater than 1 g/10 min.

13. The container closure as claimed in claim 1, wherein the sealing insert has a Shore D hardness of less than 50.

14. The container closure as claimed in claim 1, wherein the sealing insert has a Shore D hardness of between 15 and 40.

15. The container closure as claimed claim 1, wherein the Shore A hardness of the sealing insert is between 55 and 100.

16. The container closure as claimed in claim 1, wherein the sealing insert has an oxygen permeability of less than 940 cm$^3$·100 μm/m$^2$·d·bar.

17. The container closure as claimed in claim 16, wherein the sealing insert has an oxygen permeability of less than 670 cm$^3$·100 μm/m$^2$·d·bar.

18. The container closure as claimed in claim 1, wherein the sealing insert has a melt flow rate (MFR) under a 5 kg load and at 190° C. of at least 1 g/10 min.

19. The container closure as claimed in claim 1, wherein the sealing insert has a compression set (CS) at 25% compression, 23° C., and 22-hour storage of between 20% and 70%.

20. The container closure as claimed in claim 1, wherein the sealing insert has a CS at 25% compression, 40° C., and 22-hour storage of between 45% and 70%.

21. The container closure as claimed in claim 1, wherein the sealing insert has a CS at 25% compression, 70° C., and 22-hour storage of between 50% and 80%.

22. The container closure as claimed in claim 1, wherein the sealing insert has an oxygen permeability of less than 700 cm$^3$·100 μm/m$^2$·d·bar at a CS (23° C., 22-hour storage, 25% compression) of between 40% and 65% and a melt flow rate of more than 1 g/10 min under a 5 kg load and at 190° C.

23. The container closure as claimed in claim 22, wherein the sealing insert contains butyl rubber, SIBS, and at least one polyolefin.

24. The container closure as claimed in claim 1, wherein the container closure is a screw cap, a peelable aluminum closure, or a crown cap.

25. The container closure as claimed in claim 1, wherein the sealing insert is pasteurizable.

26. The container closure as claimed in claim 1, wherein the sealing insert is configured as a ring or disk and has a sealing lip around its circumference that protrudes when the container closure is in an attached state in the direction of the mouth opening of the container.

27. The container closure as claimed in claim 1, wherein the sealing insert comprises two different elements, a first element of the two different elements being ring-shaped or disk-shaped and connected to the container closure of metal or plastic and a second element of the two different elements being ring-shaped or disk-shaped and arranged on the first element at least in the area in which the container closure is configured to contact the mouth opening of the container.

28. The container closure as claimed in claim 27, wherein the first and the second elements are composed of different materials, and the material of the second element comprises at least one barrier polymer.

29. The container closure as claimed in claim 1, wherein the sealing insert comprises two different materials, a first material of the two different materials forming a disk-shaped element sandwiched between layers of a second material of the two different materials, wherein the second material is a compound including at least one barrier polymer and having a Shore D hardness of less than 40 and the first material is a compound or a pure polymer having a Shore D hardness of greater than 40.

30. The container closure as claimed in claim 29, wherein the first material comprises a barrier polymer.

31. The container closure as claimed in claim 1, wherein the sealing insert contains an oxygen-binding compound (scavenger).

32. The container closure as claimed in claim 1, wherein the sealing insert includes a metal film.

33. The container closure as claimed in claim 1, wherein the sealing insert comprises a foamed polymer compound.

34. The container closure as claimed in claim 10, wherein the at least one additive includes one or more of a plasticizer; a stickiness-reducing agent (anti-blocking agent), and a lubricant, with the proviso that a plasticizer content is less than 70% by weight, or the sealing insert is free of plasticizers.

35. The container closure as claimed in claim 30, wherein the barrier polymer includes one or more of ethylene-vinyl alcohol copolymer (EVOH) and (optionally modified) polyamide (PA).

* * * * *